United States Patent
Braun et al.

(10) Patent No.: US 9,162,862 B2
(45) Date of Patent: Oct. 20, 2015

(54) DEVICE AND METHOD FOR TREATING AT LEAST ONE CONTAINER

(71) Applicant: KRONES AG, Neutraubling (DE)

(72) Inventors: Franz Braun, Bad Abbach (DE); Jurgen Sollner, Beratzhausen (DE)

(73) Assignee: KRONES AG (DE)

( * ) Notice: Subject to any disclaimer, the term of this patent is extended or adjusted under 35 U.S.C. 154(b) by 0 days.

(21) Appl. No.: 14/208,171

(22) Filed: Mar. 13, 2014

(65) Prior Publication Data

US 2014/0260099 A1    Sep. 18, 2014

(30) Foreign Application Priority Data

Mar. 13, 2013 (DE) .......................... 10 2013 102 516

(51) Int. Cl.
| | |
|---|---|
| A61L 9/00 | (2006.01) |
| A61L 2/08 | (2006.01) |
| A62B 7/08 | (2006.01) |
| A61L 2/00 | (2006.01) |
| B67C 3/22 | (2006.01) |
| B29C 49/46 | (2006.01) |

(Continued)

(52) U.S. Cl.
CPC . B67C 3/22 (2013.01); B29C 49/46 (2013.01); B65B 55/027 (2013.01); *B29C 49/4284* (2013.01); *B29C 2049/4673* (2013.01); *B29C 2049/4697* (2013.01); *B67C 2003/228* (2013.01); *B67C 2003/2694* (2013.01)

(58) Field of Classification Search
CPC ......... A61L 2/00; A61L 2/0017; A61L 2/186; A61L 2/208; B67C 7/003; B65B 55/02
USPC ............. 422/4, 26, 28, 31–33, 113, 120, 122, 422/292, 298, 302, 305–306
See application file for complete search history.

(56) References Cited

U.S. PATENT DOCUMENTS 4,992,247 A * 2/1991 Foti ............................... 422/304

FOREIGN PATENT DOCUMENTS

| DE | 197 09 067 A1 | 9/1998 |
|---|---|---|
| DE | 19709067 A1 | 9/1998 |

(Continued)

OTHER PUBLICATIONS

Extended European Search Report in EP application EP 14 15 9380 dated Oct. 24, 2014.

(Continued)

*Primary Examiner* — Monzer R Chorbaji
(74) *Attorney, Agent, or Firm* — Haynes and Boone, LLP

(57) ABSTRACT

A device for treating at least one container, preferably for filling at least one container with a fill product and/or for reshaping a container, comprising an isolator chamber containing a defined atmosphere, in which the treatment of the container is carried out, and at least one container channel for conveying the container into the isolator chamber or for conveying the container out of the isolator chamber, and a suction device for sucking air out of the container channel and out of the isolator chamber, and a supply air preparation unit for preparing the air to be fed to the isolator chamber, wherein the suction device is connected with the supply air preparation unit in such a manner that at least a portion of the air sucked out of the container channel and/or the isolator chamber is fed to the supply air preparation unit for renewed preparation.

21 Claims, 4 Drawing Sheets

(51) Int. Cl.
  *B65B 55/02* (2006.01)
  *B67C 3/26* (2006.01)
  *B29C 49/42* (2006.01)

(56) References Cited

FOREIGN PATENT DOCUMENTS

| DE | 19945500 A1 | 4/2000 |
| DE | 20 2004 001 619 | 5/2004 |
| DE | 2004 001 619 U1 | 5/2004 |
| DE | 69825258 T2 | 7/2005 |
| DE | 2004 049520 A1 | 4/2006 |
| DE | 102004049520 A1 | 4/2006 |
| DE | 69636702 T2 | 9/2007 |
| EP | 2535650 A1 | 1/2010 |
| EP | 2 535 650 A1 | 12/2012 |
| GB | 407672 | 3/1937 |

OTHER PUBLICATIONS

EP search report dtd Jun. 25, 2014.

* cited by examiner

DEVICE AND METHOD FOR TREATING AT LEAST ONE CONTAINER

CROSS REFERENCE TO RELATED APPLICATION

This application claims priority from German Patent Application No. 10 2013 102 516.1, filed on Mar. 13, 2013 in the German Patent and Trademark Office, the disclosure of which is incorporated herein by reference in its entirety.

BACKGROUND

1. Technical Field

The present invention relates to a device and a method for treating at least one container, preferably for filling a container with a fill product in a beverage filling plant and/or for reshaping a container, for example for molding a preform into a container to be filled with fill product by stretch blow molding, wherein the treatment of the container takes place in an isolator chamber.

2. Related Art

For treating containers, and in particular for filling containers with a fill product, for example in a cold aseptic beverage filling plant, it is known to carry out the actual treatment of the containers inside a so-called isolator chamber. An isolator chamber is understood to mean a space sealed off from its surroundings in which a defined atmosphere is present, which is distinguished from the surroundings by having, for example, a reduced bacterial count, a reduced spore count, a reduced particle count, a defined temperature and/or a controlled humidity. Such an isolator chamber is typically fed with supply air which is prepared by a supply air preparation unit in order to achieve the desired atmosphere. In the supply air preparation unit, the air is for example cleaned using filter systems, brought to a defined humidity using suitable dehumidifiers or humidifiers, and brought to a defined temperature by suitable temperature control means.

For cold aseptic filling of beverages in a beverage filling plant, for example for filling containers with dairy products, it is necessary that at least in the filling area a certain temperature is not exceeded, and that the entry of bacteria and spores is reduced during filling. This can be achieved by controlling the air supplied to the isolator chamber, with the filling then being carried out inside the isolator chamber. It is possible to carry out in the isolator chamber not only the actual filling, but also, for example, sterilization of the containers to be filled and/or the closing of the filled containers, so that the defined environmental conditions can also be maintained for these treatments of the containers. The low bacterial and spore counts are of fundamental importance for the shelf life of the filled product. The lower the bacterial contamination of the filled product, the longer is its shelf life. The growth of bacteria can be further slowed by a reduced temperature in the isolator chamber.

Condensation of water from moist air can lead to increased growth of the microorganisms that are already present on the surfaces of the treatment device that the condensation moistens. Condensation can occur, for example, on filling valves, supply vessels or product feed lines, which are cooled by the flow of fill product or a separate cooling device, or on the cooled cavities of a molding tool when preforms are molded. This condensation must therefore be avoided in order to achieve hygienically acceptable treatment of the containers.

From the state of the art, it is known to supply the isolator chamber with prepared air via a central supply air preparation unit. This central supply air preparation unit normally takes in the air from the area surrounding the isolator chamber, for example from the production hall in which the device for treating the containers is installed. This ambient air is then treated by means of filters, dehumidifiers or humidifiers, and temperature control devices, then fed to the isolator chamber. The air is preferably then sucked out of the isolator chamber in a controlled manner, in order thereby to ensure a constant feed of prepared air, and to remove from the isolator chamber any particles which may have been introduced via the fill product or the container treatment process, and which are detrimental to the atmosphere in the isolator chamber, as well as for example disinfectant vapors. The extraction of disinfectant vapors may also be carried out for the protection of the operators of the plant.

The preparation of the supply air further serves to maintain a positive pressure in the isolator chamber with respect to the surroundings, in order to achieve the sealing off of the atmosphere in the isolator chamber. The extracted air is usually discharged into the open air.

In order to channel the containers that are to be treated into or out of the isolator chamber, at least one container channel is usually provided, for example in the form of an isolator intake or an isolator outlet, which serves as the transition between the surroundings and the isolator chamber. Accordingly, a transition from the ambient atmosphere to the defined atmosphere in the isolator chamber also takes place in the container channel. For this purpose the container channel is for example operated with a slight negative pressure, so that a constant flow of air occurs from the isolator chamber in the direction of the container channel, in order in this manner to prevent the ingress of ambient air into the isolator chamber via the container channel. The air sucked out of the container channel, which comprises a mixture of the air flowing from the isolator chamber and the air sucked in from the surroundings, is usually discharged into the open air.

Sterilization of the isolator chamber and those components of the plant that are located in the isolator chamber take place for example using gaseous $H_2O_2$, which is fed via the air supply to the isolator chamber, where it acts upon the applicable surfaces. The $H_2O_2$ is then sucked out of the isolator chamber and the container channel together with the other air in the isolator. For emission protection reasons, however, the $H_2O_2$ cannot be discharged directly into the open air, but must be elaborately scrubbed by means of a gas scrubber.

Since only ambient air is prepared in the supply air preparation unit, it is always necessary for 100% of the air that is fed to the isolator chamber to be prepared fully. The dimensions of the equipment used must therefore be correspondingly large.

When a preform is molded into a container to be filled with a fill product, for example by stretch blow molding, it is important for the quality of the container to be filled that condensation is avoided on the blow molds and in particular in the cavities of the tools. Since these cavities are usually cooled, they can be the site of condensation of moisture in the air, which impairs the quality of the molded containers and can also serve as the breeding ground for the multiplication of microorganisms that are already present. Here too, condensation should therefore be avoided.

SUMMARY

Proceeding from the known state of the art, a device and a method are provided for treating at least one container, in which the preparation of the air fed to an isolator chamber is carried out more efficiently, and the microbiological safety of the device is improved.

In one embodiment, a device for treating at least one container, such as for filling at least one container with a fill product and/or for reshaping a container, is proposed, comprising an isolator chamber containing a defined atmosphere, in which the treatment of the container is carried out, and at least one container channel for conveying the container into the isolator chamber or for conveying the container out of the isolator chamber, a suction device for sucking air out of the container channel and out of the isolator chamber, and a supply air preparation unit for preparing the air to be fed to the isolator chamber. In one embodiment, the suction device is connected with the supply air preparation unit in such a manner that at least a portion of the air sucked out of the container channel and/or the isolator chamber is fed to the supply air preparation unit for renewed preparation.

Because the suction device is connected with the supply air preparation unit in such a manner that at least a portion of the air sucked out of the container channel and/or the isolator chamber is fed to the supply air preparation unit for renewed preparation, it can be achieved that the air from the isolator chamber and/or from the container channel, which has already been prepared, is again prepared, and thereby for example flows again through a filter for filtering the air. In connection with this it is to be noted that the production of sterile air by filtering is based on probabilities. In other words, there exists a certain probability that a particular microorganism or a particular particle will actually be retained in the applicable filter device. Correspondingly, repeated filtering results in an increased probability of improved sterility of the air that has been prepared by this means. Thus the feeding back of the air that was sucked out of the isolator chamber and the container channel can achieve improved sterility and improved microbiological safety in the device.

Furthermore, the air sucked out of the isolator chamber and/or the container channel already has substantially the correct temperature and substantially the desired humidity, so that the effort required to restore it to the correct temperature and/or to adjust the humidity is reduced in comparison with the effort required to supply 100% ambient air. By this means, components of the device can have smaller dimensions, and/or the operation of the device can consume less energy.

The total volume flow of air sucked out of the isolator chamber and the container channel is usually greater than the volume flow of prepared air to be fed again to the isolator chamber. This is due to the fact that, in the area of the container channel, there is suction not only of air flowing from the isolator chamber, which is already prepared, but also of ambient air flowing from the outer end of the container channel which faces the surroundings. In addition, when the containers are treated in the isolator chamber, process air is usually used, which increases the total volume flow to be sucked out. Moreover, the containers to be treated are usually filled with fill product, which displaces the air volume present in these containers and thereby also increases the total volume flow to be sucked out. All of these factors contribute to making the total volume flow that is sucked out of the isolator chamber and the container channel greater than the volume flow of prepared air to be returned to the isolator chamber.

Because of this, a flow divider is provided in one embodiment, by means of which the portion of the air sucked out of the isolator chamber and/or the container channel which is fed to the supply air preparation unit is separated off. A variable flow divider is provided in one embodiment, by means of which the portion of the sucked-out air volume which is fed to the supply air preparation unit can be variably adjusted. In both cases, the surplus portion of the sucked-out air volume is for example diverted into the open air. Provision of the flow divider enables the entire inflow of air to the supply air preparation unit to be supplied from the sucked-out air. By this means, particularly efficient operation of the device can be achieved, since 100% sucked-out air is fed to the supply air preparation unit, so that the effort of temperature control and humidification or dehumidification is accordingly kept low and the microbiological safety of the device is improved.

In another embodiment, an additional ambient air feed to the supply air preparation unit is provided, through which ambient air, for example from the production hall in which the device is installed, can be fed to the supply air preparation unit. In this manner, during the preparation of supply air, the portion of ambient air that is to be newly fed into the circulation can be specified precisely.

In another embodiment, a fresh air feed to the supply air preparation unit is provided, by means of which fresh air from an external area, for example the open air, can be fed to the supply air preparation unit.

In this manner, efficient management of the plant can be achieved according to the surrounding conditions and according to the outdoor conditions. The cold air in winter is, for example, relatively dry, with the result that any dehumidification can be carried out with little effort, or even dispensed with entirely. In summer, for example, the warm air that is sucked in may not need further heating. In addition, a suitable control system for the plant can adjust the ratio of air sucked in from the surroundings, i.e. for example from the production hall, and of air sucked in from the open air, thus enabling the expenditure of energy for the preparation of supply air to be further reduced.

In another embodiment, a control system is provided, which controls the ratio of fresh air and ambient air that is fed to the supply air preparation unit, according to the applicable surrounding conditions and outdoor conditions, and according to the required operating parameters of the device.

A cold trap is provided, in one embodiment, downstream of the suction device, in order to render the air sucked out of the isolator and the container channel free of disinfecting agent and/or sterilizing agent, for example $H_2O_2$. To achieve this, the air is cooled in the cold trap to below the condensation temperature of the component that is to be removed, for example below the condensation temperature of the $H_2O_2$ present in the applicable concentration, so that this component condenses and is accordingly removed from the airflow. By this means, before a portion of the extracted air is discharged into the open air, the disinfecting agent and/or sterilizing agent, for example the $H_2O_2$, can be removed, without the need to accomplish this by means of an elaborate gas scrubber. The plant as a whole can thereby have a more simple design, and the supply air preparation unit can be supplied constantly with air which is relatively dry and substantially free of disinfecting agent and/or sterilizing agent for processing, for example for renewed filtering and temperature control.

In order to reduce or prevent discharge of disinfecting agent and/or sterilizing agent into the surroundings, a cold trap, in one embodiment, is disposed before a flow divider. In a further embodiment, a cold trap for preventing the discharge of disinfecting agent and/or sterilizing agent can also be disposed after a flow divider in the branch of the air routing that leads to the open air. In this manner the energy consumption of the cold trap is reduced, since only that portion of the sucked-out air that is to be discharged into the open air needs to be treated in the cold trap.

In the above-mentioned embodiment, at least one additional cold trap is then provided in the supply air preparation unit, in order to dry the air that is to be fed to the isolator. This cold trap can for example be operated at a different temperature, making it then possible for each cold trap to be optimized for its particular area of application.

In addition to, or as an alternative to, a cold trap, at least one catalyst can be provided, disposed downstream of the suction device, for breaking down the disinfecting agent and/or cleaning agent. In this manner the disinfecting agent and/or cleaning agent can be destroyed before the extracted air is discharged into the surroundings, or before the extracted air is reused by being fed back to the isolator chamber. By the use of catalysts, the cold trap can also be operated at a higher temperature, with the result that the energy cost of operating the cold trap can be reduced.

The supply air preparation unit is, in one embodiment, in the form of a central supply air preparation unit, by means of which the supply air is prepared for and conveyed to a plurality of consumers in a container treatment plant.

The supply air preparation unit, in one embodiment, comprises at least one sterile filter, at least one temperature control device, a cold trap, and/or at least one means of adjusting the air humidity. In this manner the air to be supplied can be prepared such that the desired atmosphere is created in the isolator chamber. By means of a suitable fan, the required slight positive pressure is then produced in the isolator chamber, serving to maintain a constant airflow in the direction of the container channel and thereby achieving the isolation of the isolator chamber.

A heat exchanger is provided in one embodiment, disposed such that it extracts thermal energy from the portion of the sucked-out air that is not fed to the supply air preparation unit, and supplies this thermal energy to the supply air preparation unit, the ambient air feed and/or the fresh air feed. In this manner the energy efficiency of the device can be further improved, since the thermal energy of the sucked-out air can be substantially retained in the device.

In a further embodiment, the supply air preparation unit is also provided for dosing disinfecting agent and/or cleaning agent to the air that is to be fed to the isolator chamber. For example, gaseous $H_2O_2$ can be dosed as a disinfecting agent. The cleaning and sterilization of the interior of the isolator can then be carried out by means of the air supplied to the isolator chamber.

In one embodiment, a surface of the device, preferably a filling valve, a supply vessel, a product feed line, or a cavity in a tool for molding containers, is cooled with a coolant which has previously passed through a cold trap for preparing the air fed to the isolator chamber. In this manner it can be achieved that the surface of the device is maintained at a temperature that is at least slightly higher than the temperature of the cold trap. The air fed to the isolator chamber, which has already passed through the cold trap, therefore no longer condenses on the surface of the device, since it has already passed over a colder surface in the cold trap, which has led to a corresponding drying of the air. By means of the proposed linking, via a common coolant, of a suitably dimensioned cold trap to a surface cooling of a tool for molding a container, the condensation of moisture in the cooled cavities of the tool is avoided.

Accordingly, a method for treating containers, such as for filling containers with a fill product and/or for reshaping a container, is proposed, wherein the treatment is carried out in an isolator chamber, containers are conveyed into the isolator chamber via at least one container channel, a defined atmosphere is produced in the isolator chamber by means of a supply air preparation unit, and air is sucked out of the isolator chamber and the container channel by means of a suction device. According to one embodiment, at least a portion of the air sucked out of the isolator chamber and/or the container channel by means of the suction device is fed back to the supply air preparation unit.

BRIEF DESCRIPTION OF THE FIGURES

Further embodiments and aspects of various embodiments are more fully explained by the description below of the figures. The figures show.

DETAILED DESCRIPTION

Examples of embodiments are described below with the aid of the figures. In the figures, elements which are identical or similar, or have identical effects, are designated with identical reference signs, and repeated description of these elements is in part dispensed with in the description below, in order to avoid redundancy.

Figure 1:
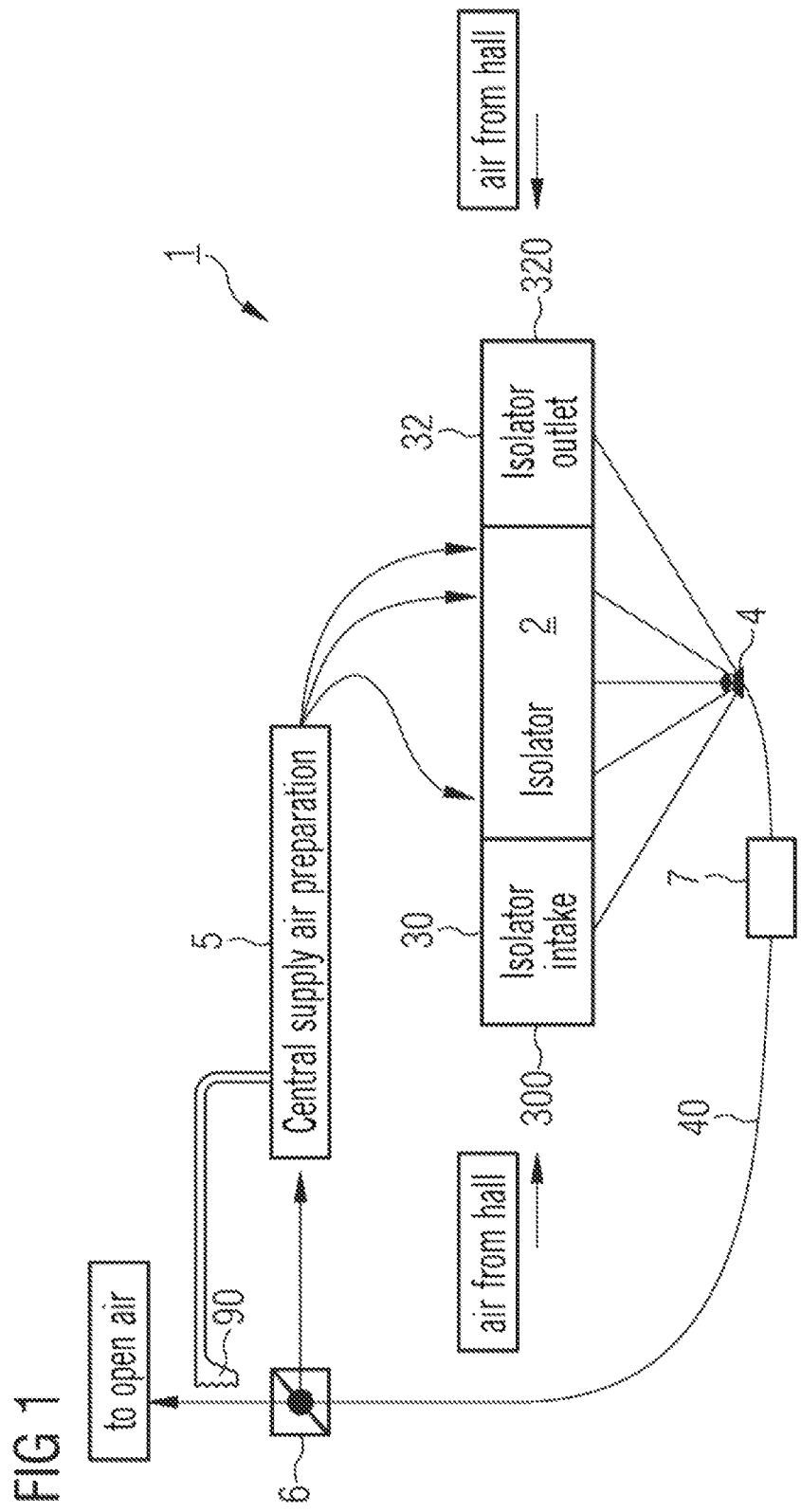
FIG. 1 is a schematic representation of a device for treating containers in a first embodiment.

FIG. 1 shows a device 1 for treating at least one container, in a schematic representation according to one embodiment. An isolator chamber 2 is provided, in which the actual treatment of the container takes place, for example sterilization, filling or closing of the container. Treatment of the containers can also take place by reshaping the containers, for example by molding a preform into a container to be filled with a fill product.

In order to convey containers, for example preforms or containers to be filled with a fill product, into and out of the isolator chamber 2, two container channels 30, 32 are provided, wherein the first container channel 30 is configured as an isolator chamber intake, thus enabling the conveying of containers into the isolator chamber 2, and the second container channel 32 is configured as an isolator chamber outlet, thus enabling the conveying of containers out of the isolator chamber 2.

The isolator chamber 2 is configured to be substantially hermetically sealed against the surrounding atmosphere. A defined atmosphere is provided in the isolator chamber 2, with for example a defined bacterial count, a defined spore count, a defined temperature and a defined humidity. In this manner it can be achieved, for example, that when the treatment of containers in the isolator chamber takes the form of filling the containers, for example by cold aseptic filling with a beverage, the shelf life of the fill product with which the containers are filled is extended. For this purpose, in particular in the case of cold aseptic or ESL (extended shelf life) filling in the isolator chamber 2, an atmosphere is maintained, in one embodiment, with as low a bacterial count as possible, as low a spore count as possible, a temperature between approximately 4° C. and the ambient temperature, and a low humidity. The isolator chamber 2 disposed in the filling area of the device is for example operated such that clean room classification ISO 5 can be assigned to the atmosphere contained within.

Slight positive pressure is produced in the isolator chamber 2, such that there is a constant flow of air out of the isolator chamber 2 into the container channel 30 and/or the container channel 32, and accordingly no ingress of ambient air can take place via the outer ends of the container channels 300 and/or 320, respectively, so that a defined atmosphere can thereby be produced and maintained in the isolator chamber 2. Furthermore, the operator of the plant can be protected from outflowing isolator chamber atmosphere, which is particularly important in the case of cleaning and disinfection of the isolator chamber 2 with a disinfecting agent that is harmful to health, such as for example $H_2O_2$.

A suction device 4 is provided, by means of which the air can be sucked out of both the isolator chamber 2 and the container channels 30, 32. In the isolator chamber 2, this achieves a constant agitation of the air volume contained in the isolator chamber 2, so that a uniform, defined atmosphere can be provided in the isolator chamber 2. The extraction of the air from the container channels 30, 32 via the suction device 4 enables a slight negative pressure to be provided in the area of the container channels 30, 32 with respect to the surrounding atmosphere, such that the ambient air from the outer ends of the container channels 300, 320 is sucked out by the suction device 4, and likewise cannot enter the isolator chamber 2. The slight positive pressure in the isolator chamber 2 and the slight negative pressure in the container channels 30, 32 enable the complete isolation of the isolator chamber 2 with respect to the surrounding atmosphere to be achieved, even though containers enter or leave the isolator chamber 2 via the respective container channels 30, 32.

A supply air preparation unit 5 is provided, which prepares the air that is to be fed to the isolator chamber 2, and that has defined properties. The supply air preparation unit 5 serves for example to render the supply air substantially free of bacteria and/or spores, and bring it to a specified temperature and humidity. For this purpose at least one sterile filter is provided, in one embodiment, in the supply air preparation unit 5, by means of which the bacterial contamination of the air to be supplied is reduced. The sterile filter can be for example in the form of a HEPA filter (High Efficiency Particle Air Filter). The supply air preparation unit 5 further comprises, in one embodiment, a temperature control means, for example a heating or cooling device, by means of which the air to be supplied to the isolator chamber 2 is brought to the desired temperature. In the supply air preparation unit 5, means of adjusting humidity are also provided in one embodiment, for example in the form of a cold trap for removing moisture from the air, or a vaporizer for adding moisture to the air, so that the air supplied to the isolator chamber 2 has the desired properties.

The supply air preparation unit 5 can additionally have a dosing device, not shown in the figures, for dosing disinfecting agent and/or cleaning agent, for example in the form of gaseous $H_2O_2$. As a result, the cleaning and/or sterilization of the isolator chamber 2 can be achieved simply, by means of the dosing of the applicable cleaning agent and/or sterilizing agent into the prepared airflow that is introduced into the isolator chamber 2.

The suction device 4 in the example embodiment shown in FIG. 1 is connected with the supply air preparation unit 5 via a suitable air guide 40 and a variable flow divider 6, in such a manner that at least a portion of the air extracted by the suction device 4 from the isolator chamber 2 and the container channels 30, 32 is fed via the air guide 40 and the flow divider 6 to the supply air preparation unit 5.

By means of this re-circulation of the air extracted from isolator chamber 2 and the container channels 30, 32 back to the supply air preparation unit 5, it can first be achieved that the microbiological contamination of the air fed to the isolator chamber 2 is further reduced, since the applicable sterile filter in the supply air preparation unit 5 is exposed to air which has already been filtered. Because the process of sterile filtering of air is based on probability, there is a higher probability that the air thus re-circulated has a lower level of microbiological contamination.

Furthermore, the re-circulated air is already substantially temperature-controlled and has substantially the specified humidity, with the result that its preparation in the supply air preparation unit 5 requires less energy.

In the isolator chamber 2 and the container channels 30, 32, a greater volume of air is usually extracted by the suction device 4 than is required by the supply air preparation unit 5. The reason for this is, first, that additional ambient air is sucked in via the open outer ends 300, 320 of the container channels 30, 32, and secondly that treatment processes are carried out in the isolator chamber 2 on the containers. In these processes, for example, process air is used, and/or the volume of air in the container to be filled is displaced by the fill product. Thus only a portion of the air extracted by the suction device 4 is fed via the flow divider 6 to the supply air preparation unit 5. The remaining portion is released into the open air.

When disinfection and/or sterilization of the interior of the isolator chamber 2 is carried out using a disinfecting and/or sterilizing agent, for example $H_2O_2$, this agent is also extracted by the suction device. The agent, for example $H_2O_2$, is preferably filtered out via the cold trap 7 disposed downstream of the suction device 4. To do this, the cold trap 7 must have a temperature lower than the condensation point of the applicable agent, for example lower than the condensation point of the $H_2O_2$ in the applicable concentration of $H_2O_2$. In this manner the release of the extracted air into the open air can also take place without problems, avoiding the risk of contamination of the environment.

In a further development that is not shown in the figures, at least one catalyst can be provided instead of, or in addition to, the cold trap 7, for destroying the disinfecting agent and/or the cleaning agent. The use of the catalyst enables the temperature provided by the cold trap 7 to be higher, so that the energy required can be reduced.

When a catalyst is used, the cold trap 7 can for example also be disposed downstream of a flow divider 6, so that only the portion of the air that is fed to the supply air preparation unit 5 for renewed preparation passes through the cold trap 7. The portion of the air that is diverted into the open air can be rendered free of disinfecting agent by means of the catalyst, but does not need to be further dried. In this manner, energy can be saved during operation.

The supply air preparation unit 5, in one embodiment, is a central supply air preparation unit, by means of which a plurality of consumers in a device 1 for treating containers can be supplied with the defined atmosphere.

Figure 2:
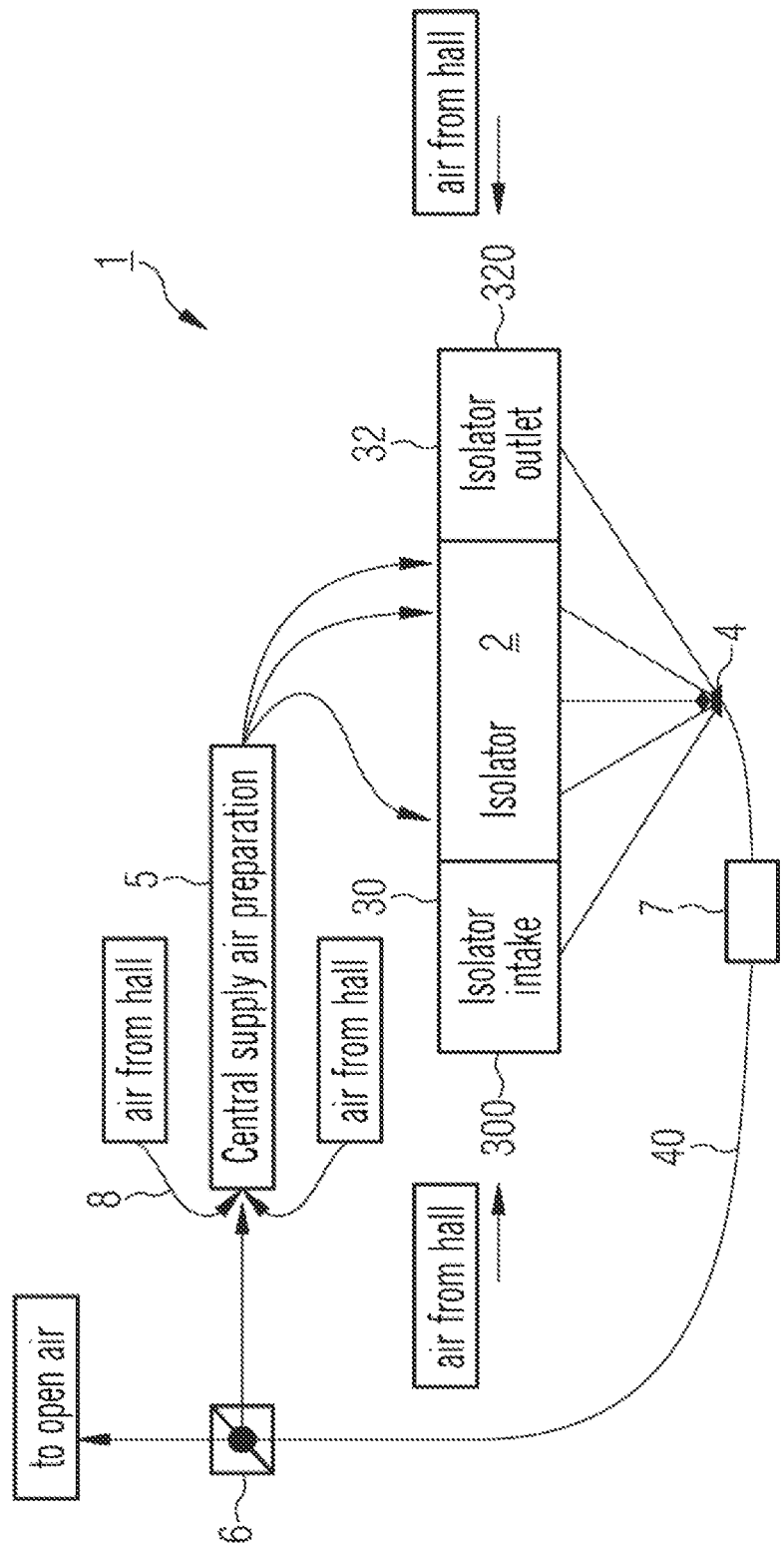
FIG. 2 is a schematic representation of a device for treating containers in a second embodiment.

In FIG. 2, a further embodiment of the device 1 is shown. In this embodiment, portions of ambient air are additionally fed to the supply air preparation unit 5 via an ambient air feed 8. In this manner, a mixture can be produced of the air extracted by the suction device 4 and ambient air, and this mixture can be fed to the supply air preparation unit 5. An advantageous mixture ratio can thereby be produced from the different airflows.

Figure 3:
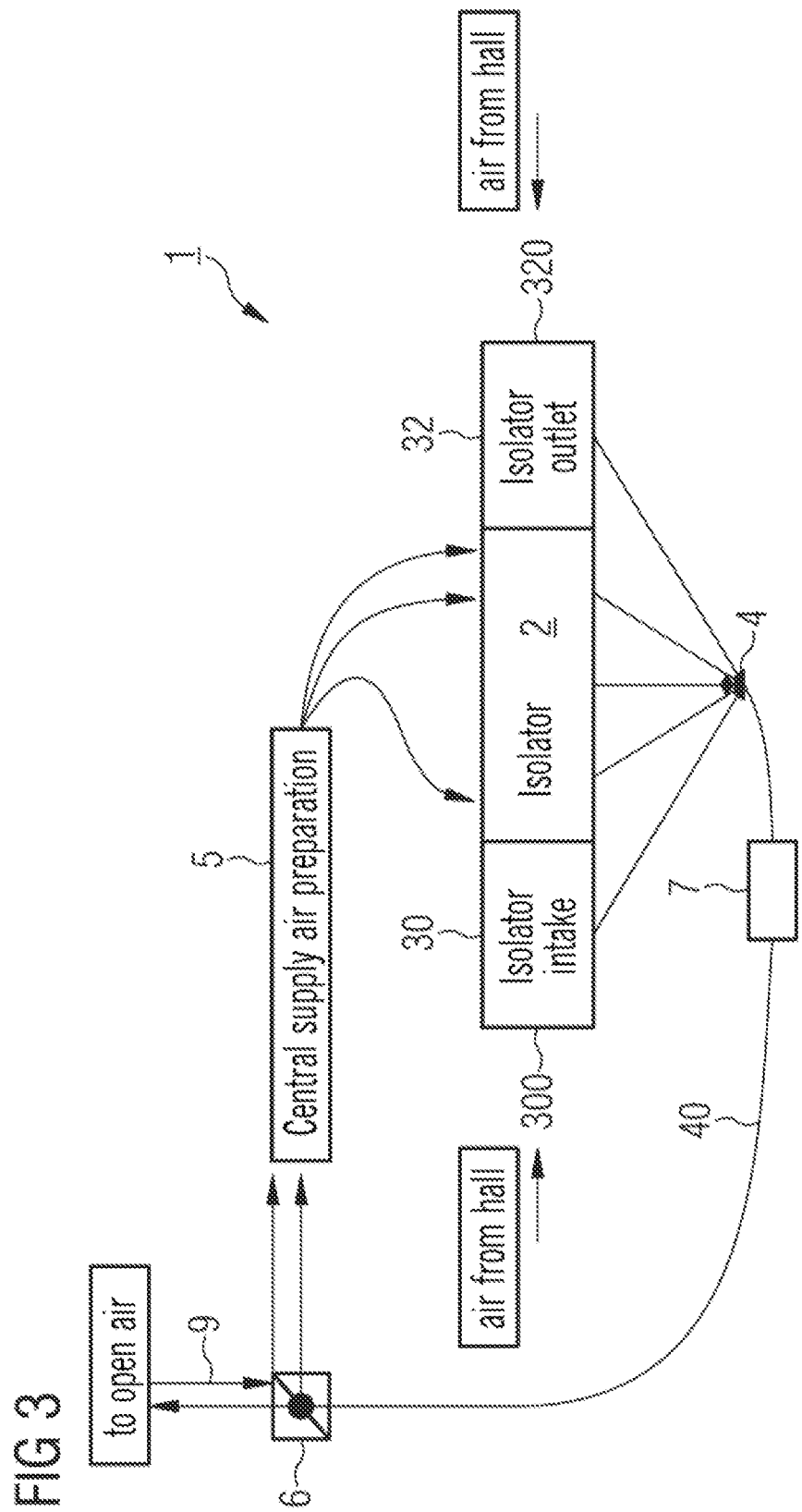
FIG. 3 is a schematic representation of a device for treating containers in a third embodiment.

FIG. 3 shows a further embodiment in which fresh air from the area surrounding the applicable production hall, for example from the open air, can be fed by means of a fresh air feed 9 to the supply air preparation unit 5.

With an advantageous combination of the feeds shown in FIGS. 2 and 3 of ambient air from the applicable production hall and fresh air from the area surrounding the production hall, it is possible to achieve, by appropriate adjustment of the mixture ratio, a particularly preferable feed to the supply air preparation unit 5 of air to be prepared. By means of the mixing of the extracted air with fresh air and ambient air, it is possible to achieve an optimization of the energy consumption, in combination with an improvement of the microbiological safety of the plant.

Accordingly, depending on the conditions in the production hall and the outdoor conditions, a control system (not shown) can achieve an optimization of the air to be fed to the supply air preparation unit 5 and thereby prepared. For example in winter, when the outdoor air is relatively dry and cold, fresh air from outside can be fed in, so that the effort of drying and/or cooling the supply air can be reduced. In summer, on the other hand, warm air can be drawn from outdoors, so that any necessity to heat the supply air is reduced or avoided.

Energy can further be saved by using a heat exchanger 90 (in FIG. 1), by means of which a portion of the thermal energy present in the sucked-out air can be extracted before it is discharged into the open air. This thermal energy can then be supplied to the supply air preparation unit 5, in order to make additional energy available for the cooling or heating of the air that is to be prepared. Alternatively, or in addition, the thermal energy can be supplied to an ambient air feed 8 or a fresh air feed 9.

The device described above can also be deployed in filling plants according to the laminar flow system, wherein the air the air is sucked out or channeled away at overflow openings disposed at the bottom, and subsequently, after preparation in the air preparation unit, fed back to the clean room from above.

Figure 4:
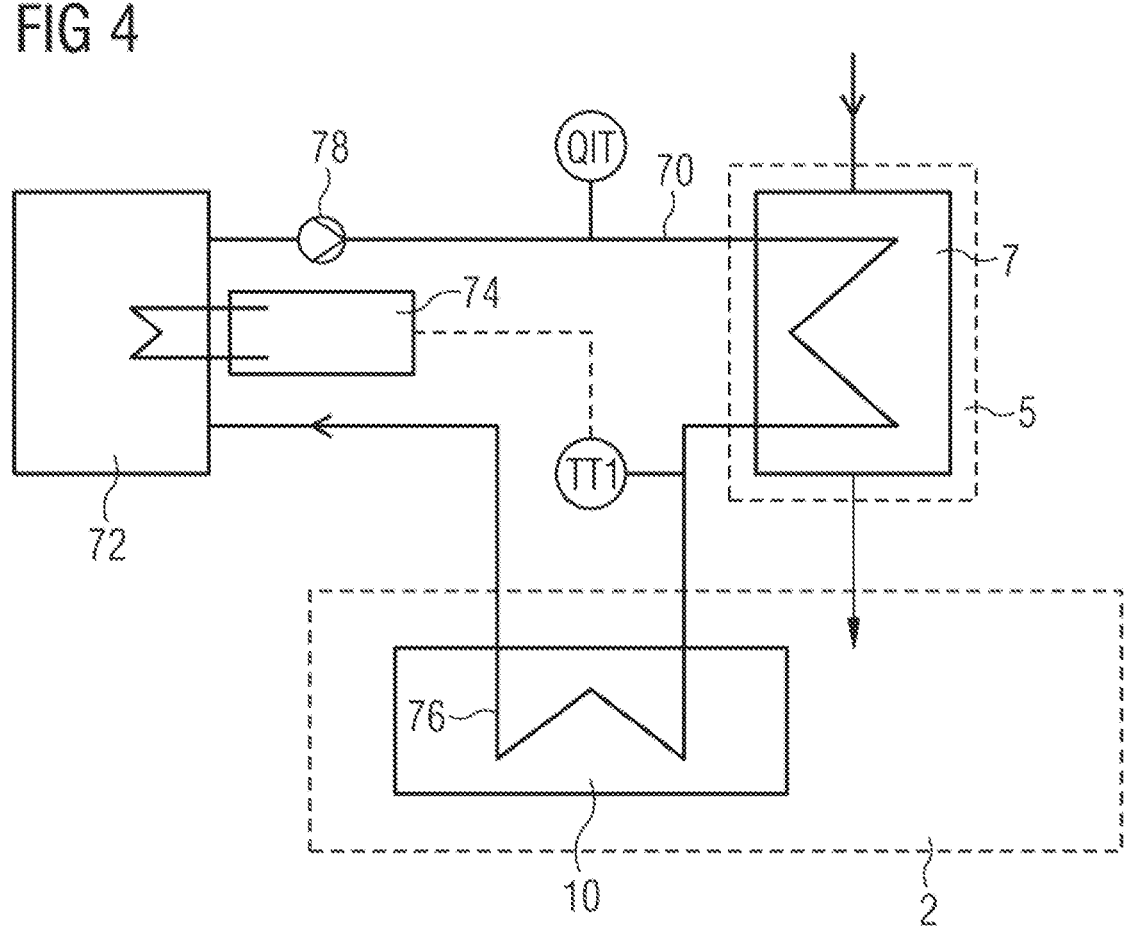
FIG. 4 is a schematic representation of a coolant circuit according to one embodiment.

FIG. 4 shows schematically a coolant circuit 70, by means of which coolant, for example glycol, flows from a cold trap 7 into a tool 10 for molding a container, for example for molding a preform into a container to be filled. In the example embodiment that is shown, the cold trap 7 is schematically integrated in the supply air preparation unit 5, so that the air to be fed to the isolator chamber 2 flows over the cold trap 7 that is integrated in the supply air preparation unit 5 before entering the isolator chamber 2.

The coolant is maintained by a cooling unit 72 at a temperature controlled by a thermostat TT1, and pumped by a pump 78 at a constant volume flow rate. The cooling unit 72 comprises in a known manner a compressor 74, which provides the cooling energy to enable the cooling of the coolant.

In the molding tool 10, a suitable coolant line 76 achieves the cooling of the surfaces of the tool 10, preferably of the cavities of the tool 10. The coolant, which has already flowed through the cold trap 7, and reaches the coolant line 76 for cooling the surfaces of the tool 10 in the coolant circuit 70, has already absorbed some thermal energy in the area of the cold trap 7. Accordingly, when the coolant flows through coolant line 76 it already has a somewhat higher temperature than when it previously flowed through the cold trap 7. The air that passes through the cold trap has correspondingly already come into contact with a surface that is colder than that of the subsequent surfaces of the tool 10. Condensation on the surfaces of the tool 10 therefore either no longer takes place, or at least takes place only in a reduced form.

A similar arrangement can also be provided, for example, in a filler for filling containers, wherein suitable coolant lines 76 are provided on the product path, serving for example to cool the supply vessel, the product feed line and/or the filling valve. By means of a suitable coolant circuit, in which the coolant first flows through the cold trap and only subsequently flows through the coolant lines in the product path, a slightly warmer temperature level can be achieved in the product path than that which prevails in the cold trap 7, with the result that condensation on the surfaces that form the product path can be reduced or prevented.

To the extent applicable, all individual features described in the individual example embodiments can be combined with each other and/or exchanged, without departing from the field of the invention.

The invention claimed is:

1. A system comprising:
   an isolator chamber configured to treat a container;
   a first container channel coupled to the isolator chamber for conveying the container into or out of the isolator chamber;
   a supply air preparation unit coupled to the isolator chamber configured to prepare air to be fed to the isolator chamber; and
   a suction device coupled to the isolator chamber and the supply air preparation unit and configured to suck air out of the isolator chamber and provide at least a portion of the air out of the isolator chamber to the supply air preparation unit.

2. The system of claim 1, wherein the suction device is further coupled to the first container channel and configured to suck air out of the first container channel and provide at least of a portion of the air out of the first container channel to the supply air preparation unit.

3. The system of claim 1, further comprising a second container channel coupled to another portion of the isolator chamber for conveying the container into or out of the isolator chamber and wherein the suction device is further coupled to the second container channel and configured to suck air out of the second container channel and provide at least of a portion of the air out of the second container channel to the supply air preparation unit.

4. The system of claim 1, further comprising a flow divider coupled between the suction device and the supply air preparation unit and configured to provide at least a portion of the air out of the isolator chamber to the supply air preparation unit.

5. The system of claim 4, wherein the flow divider is configured to provide only a partial portion of the air out of the isolator chamber to the supply air preparation unit.

6. The system of claim 1, wherein the supply air preparation unit is further configured to receive ambient air.

7. The system of claim 1, wherein the supply air preparation unit is further configured to receive fresh air.

8. The system of claim 1, further comprising a control system configured to control a ratio of sucked out air, fresh air, and/or ambient air that is fed to the supply air preparation unit.

9. The system of claim 1, further comprising a cold trap located between the supply air preparation unit and the suction device and configured to remove disinfecting agents and/or sterilizing agents from sucked out air.

10. The system of claim 9, wherein the disinfecting agent comprises $H_2O_2$.

11. The system of claim 1, wherein the supply air preparation unit comprises at least one sterile filter, at least one temperature control device, at least one cold trap, and/or at least one means of adjusting air humidity.

12. The system of claim 1, further comprising a heat exchanger configured to extracts thermal energy from at least a portion of sucked-out air that is not fed to the supply air preparation unit and provide the thermal energy to the supply air preparation unit.

13. The system of claim 1, wherein the supply air preparation unit is further configured for providing a disinfecting agent and/or a cleaning agent to air that is supplied to the isolator chamber.

14. The system of claim 1, further comprising a tool that receives a coolant which has previously passed through a cold trap for preparing the air fed to the isolator chamber.

15. A system comprising:
- an isolator chamber configured to treat a container and having a defined atmosphere;
- a first container channel coupled to a first portion of the isolator chamber for conveying the container into or out of the isolator chamber;
- a second container channel coupled to a second portion of the isolator chamber for conveying the container into or out of the isolator chamber;
- a supply air preparation unit coupled to the isolator chamber configured to prepare air to be fed to the isolator chamber; and
- a suction device coupled to the isolator chamber, the first container channel, the second container channel, and the supply air preparation unit and configured to suck air out of the isolator chamber, the first container channel, and the second container channel and provide at least a portion of the air out of the isolator chamber, the first container channel, and the second container channel to the supply air preparation unit.

16. The system of claim 15, further comprising a flow divider coupled between the suction device and the supply air preparation unit and configured to provide at least a portion of the air out of the isolator chamber, the first container channel, and the second container channel to the supply air preparation unit.

17. The system of claim 16, wherein the supply air preparation unit also receives ambient air and/or fresh air.

18. A method comprising:
- providing a container in a chamber;
- preparing air for treating the container;
- providing the prepared air to the chamber for treating the container;
- sucking air out of the chamber; and
- providing at least a portion of the sucked out air for preparation for further treating the container.

19. The method of claim 18, further comprising providing the at least a portion of the sucked out air to the chamber.

20. The method of claim 18, further comprising sucking air out of a first container channel and/or a second container channel and providing the sucked out air from the first container channel and/or the second container channel for preparation for further treating the container.

21. The method of claim 20, further comprising providing at least a portion of the prepared sucked out air to the chamber.

\* \* \* \* \*

UNITED STATES PATENT AND TRADEMARK OFFICE
CERTIFICATE OF CORRECTION

| | | |
|---|---|---|
| PATENT NO. | : 9,162,862 B2 | |
| APPLICATION NO. | : 14/208171 | |
| DATED | : October 20, 2015 | |
| INVENTOR(S) | : Franz Braun and Jurgen Sollner | |

It is certified that error appears in the above-identified patent and that said Letters Patent is hereby corrected as shown below:

In The Specification

In column 7, line 4:

Change the word "outfiowing" to --"outflowing"--

Signed and Sealed this
Tenth Day of May, 2016

Michelle K. Lee
*Director of the United States Patent and Trademark Office*